(12) United States Patent
Wang

(10) Patent No.: US 6,986,364 B1
(45) Date of Patent: Jan. 17, 2006

(54) BRANCHED WATER TIMER

(76) Inventor: Hsin-Fa Wang, No. 68, Mou Tan Lane, Shao An Li, Lu Kang Town, Chang Hua Hsien (TW)

( * ) Notice: Subject to any disclaimer, the term of this patent is extended or adjusted under 35 U.S.C. 154(b) by 0 days.

(21) Appl. No.: 10/967,678

(22) Filed: Oct. 18, 2004

(51) Int. Cl.
  *B05B 12/02* (2006.01)
  *A01G 27/00* (2006.01)
  *G06F 15/46* (2006.01)

(52) U.S. Cl. ............... 137/624.11; 137/883; 239/70
(58) Field of Classification Search ........... 137/624.11, 137/624.12, 883; 239/70
  See application file for complete search history.

(56) References Cited

U.S. PATENT DOCUMENTS

| | | | | |
|---|---|---|---|---|
| 4,633,905 A | * | 1/1987 | Wang | 137/624.11 |
| 4,807,664 A | * | 2/1989 | Wilson et al. | 137/624.11 |
| 5,143,290 A | * | 9/1992 | Wang | 239/70 |
| 5,826,619 A | * | 10/1998 | Roman | 137/624.11 |
| 6,016,836 A | * | 1/2000 | Brunkhardt | 137/624.11 |
| 6,397,888 B1 | * | 6/2002 | Wang | 137/883 |
| 6,398,185 B1 | * | 6/2002 | Wang | 251/249 |

* cited by examiner

*Primary Examiner*—Kevin Lee
(74) *Attorney, Agent, or Firm*—Egbert Law Offices

(57) ABSTRACT

A water timer includes a housing, which is available with a water inlet and at least two water outlets. Some water channels are separately mounted between water inlet and water outlets. Some membranes are provided within the water channel to control the start/stop of water flow and a time set is installed onto the top of the housing and connected to a membrane via the help of a brake bar. The water inlet, two water outlets and water channel are integrated into the housing. Moreover, the water inlet is designed with a concave "⊏"-shaped Y-branch at a first side of the housing, where it forms a first inlet, second inlet and a manifold branch. With an open lateral surface, the manifold branch is enclosed by a connecting seat. And, the exterior of connecting seat is applied for the linking of the water supply connector.

6 Claims, 8 Drawing Sheets

BRANCHED WATER TIMER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a water timer, and more particularly to a water timer which is comprised of an innovative design for the internal channel.

BACKGROUND OF THE INVENTION

The water timer is generally mounted onto a preset section of the water pipe, where a timer set is used to control the opening time of a valve in order to control automatically water supply time. The conventional water timer is only designed with a single inlet and outlet, which is not suitable for a bi-directional water supply environment. For this reason, an innovative water timer with a single inlet and two outlets has been developed accordingly. However, attentions shall be paid to the convenience of assembly of the timer set due to the complex channel. So, this industry has met a challenge as to how the housing and internal channel of the water timer are integrated simply to minimize the manufacturing and assembly cost. With a view to the construction of existing water timers, the housing and channel are generally manufactured separately and then assembled, leading to higher manufacturing cost and poor efficiency of assembly.

Therefore, with a view to the above-mentioned problems for water time, this industry shall assume the responsibility to make some pioneering R& D and innovations for ideal utility model.

BRIEF SUMMARY OF THE INVENTION

The water in the present invention features a water inlet, which is designed with a concave "⊏"-shaped space at one side of the housing. So, this spatial design presents a first inlet, second inlet and a manifold branch. As the water channel is designed with a central groove and outer groove with a downward aperture, the inner sides of two water inlets and outlets are separately connected to the outer groove and central groove. Based on this spatial feature, the housing can be integrally preformed via the male and female models along with the slide blocks, thereby saving greatly the manufacturing and assembly cost for an improved economic efficiency.

DETAILED DESCRIPTION OF THE INVENTION

Figure 1:
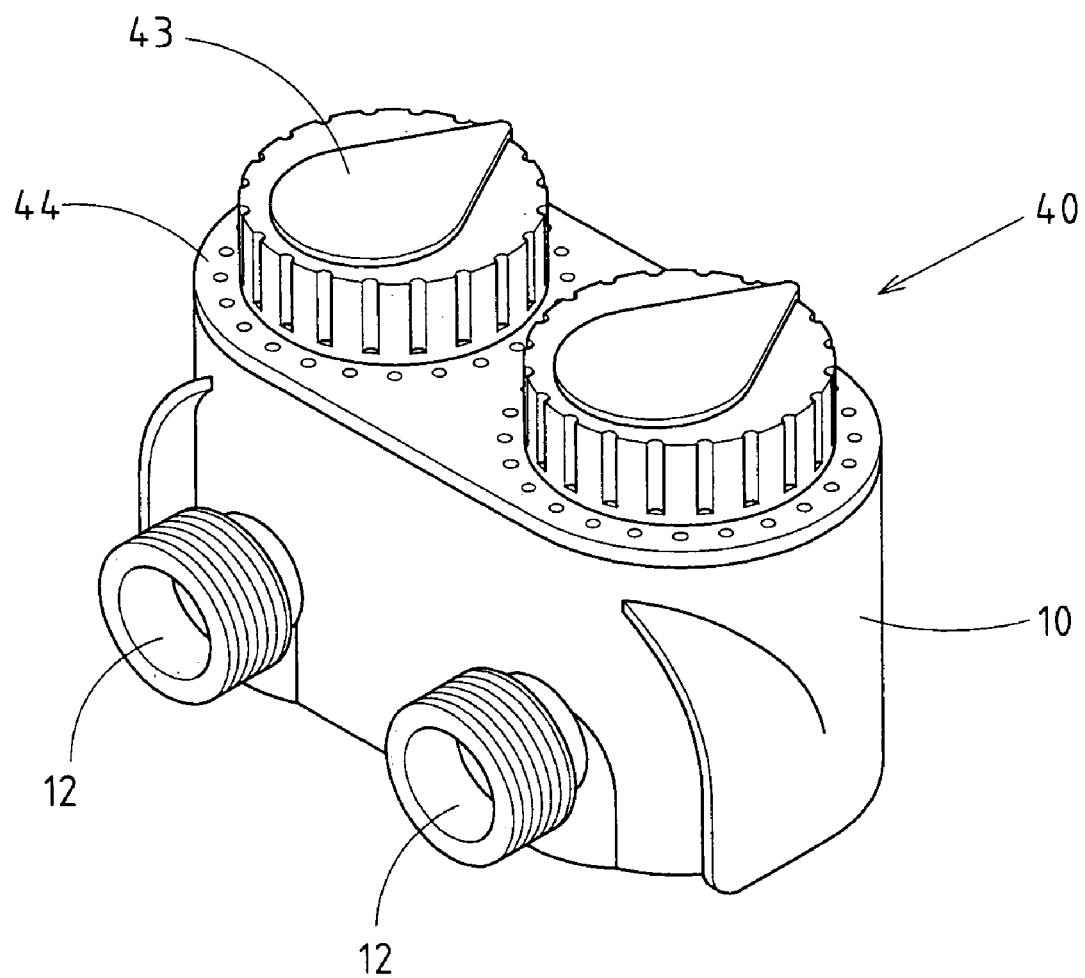
FIG. 1 shows a perspective view of the present invention.

The features and the advantages of the present invention will be more readily understood upon a thoughtful deliberation of the following detailed description of a preferred embodiment of the present invention with reference to the accompanying drawings.

As shown in FIGS. 1–7, there is a water timer embodying the present invention.

The invention includes a housing 10, which is available with a water inlet 11 and at least two water outlets 12. The water inlet 11 is connected to water outlets 12 via water channel 20, which is mounted with membrane 30 to control the start/stop of water flow. And, a time set 40 is installed onto the top of the housing 10 (The existing timer set in this example generally comprises a rotary knob and a gear drive. No detailed description is required as this section is not defined in this example). With the help of a brake bar 41, the bottom of timer set 40 is connected to a membrane 30 in a manner to control the opening time of the membrane.

The water inlet 11, two water outlets 12 and water channel 20 are integrated into the housing 10 (jet molding in this example). Moreover, the water inlet 11 is designed with a concave "⊏"-shaped Y-branch at first side of the housing 10, where it forms a first inlet 111, second inlet 112 and a manifold branch 113 linking the first and second inlet. Available with an open lateral surface, the manifold branch is enclosed by a connecting seat 13. And, the exterior of connecting seat 13 is applied for the linking of water supply connector 50 to form the water inlet. Two water outlets 12 are integrally preformed at the second side of the housing 10 opposite to water inlet 11. As it is installed between two water outlets 12 and the inner side of above-specified first/second inlet 111 112, the water channel 20 is available with a central groove 21 and outer groove 22 with a downward aperture. So, the inner side of the first/second inlet 111 112 is connected to the outer groove 22, and the inner side of two water outlets 12 connected to the central groove 21. There is a punch hole 23 at upper wall of the central groove 21, where the brake bar 41 of timer set 40 can penetrate downwards such that the membrane 30 is provided at the open bottom of central groove 21 and outer groove 22. A bottom cap 60 is mounted at the bottom of the water channel 20, and an elastic member 31 (a spring in this example) is installed between the bottom cap and an expansion bottom seat 42 of the brake bar 41 at the center of membrane 30. So, it can normally support the bottom seat 42 to enable the membrane 30 to be positioned at the open bottom of central groove 21 and outer groove 22 for watertightness.

Figure 8:
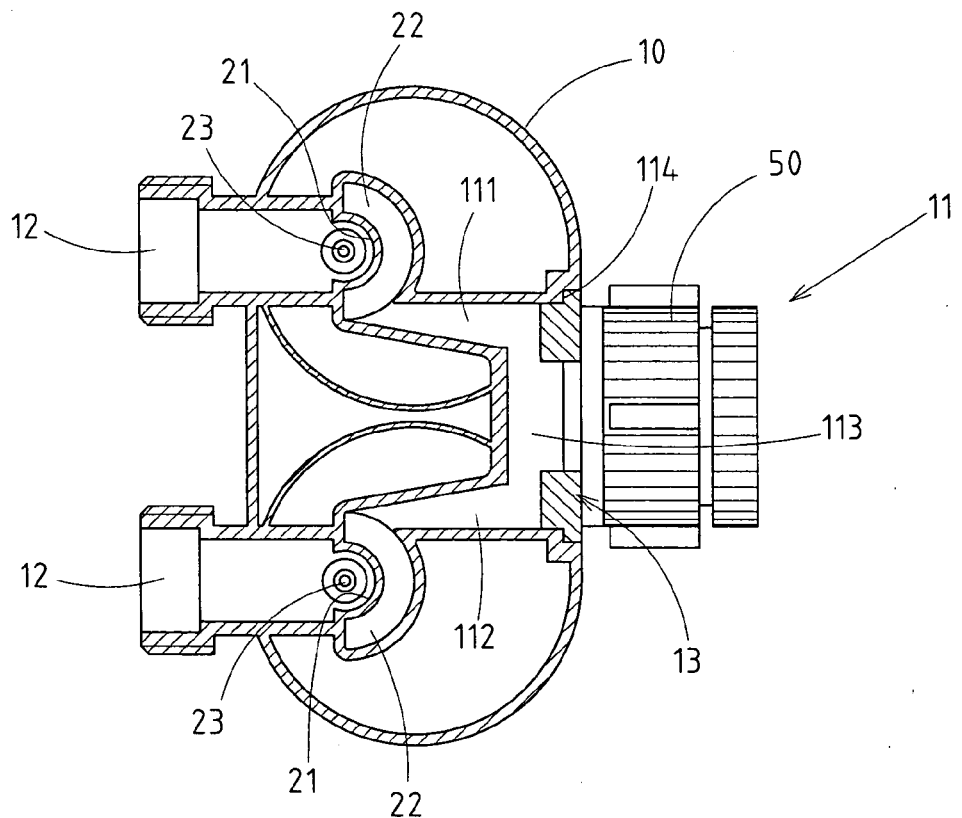
FIG. 8 shows a horizontal sectional view of the internal branch of the housing in assembled state.
Figure 9:
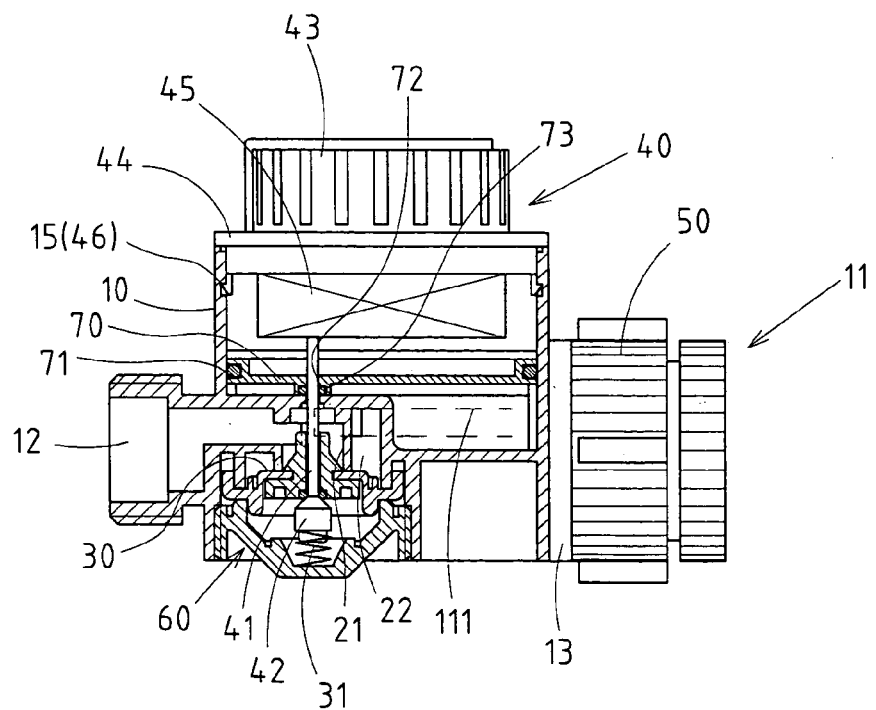
FIG. 9 shows a vertical sectional view of the internal branch of the housing in assembled state.
Figure 10:
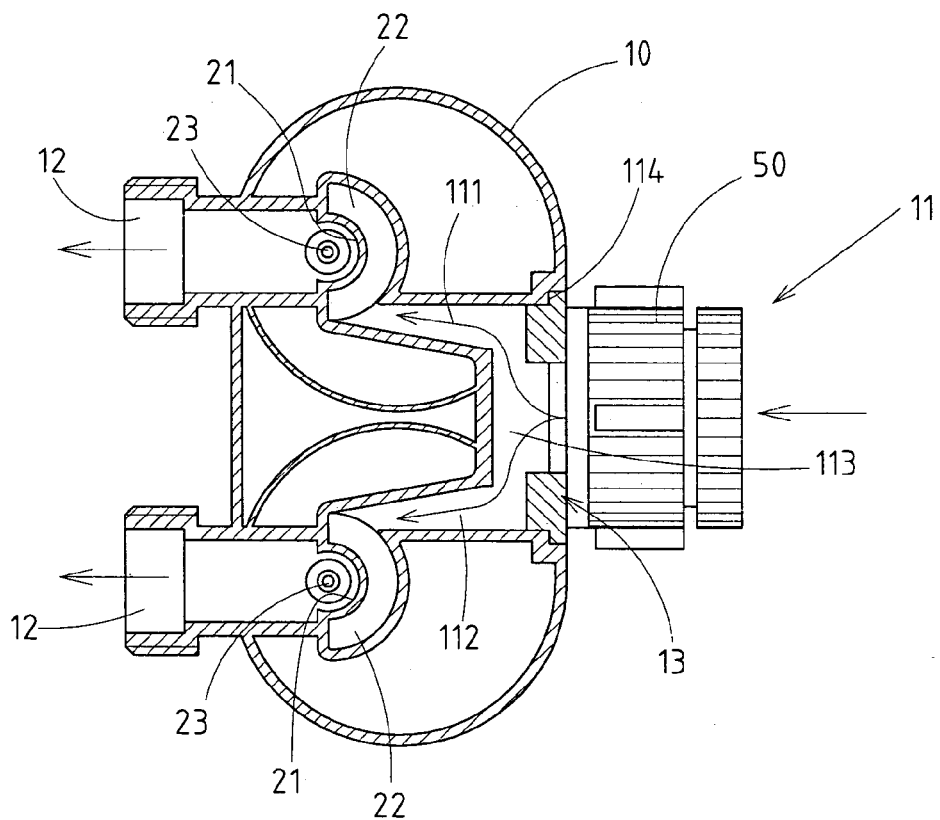
FIG. 10 shows a horizontal sectional view of the water flow diagram in open state in the internal branch of the housing.
Figure 11:
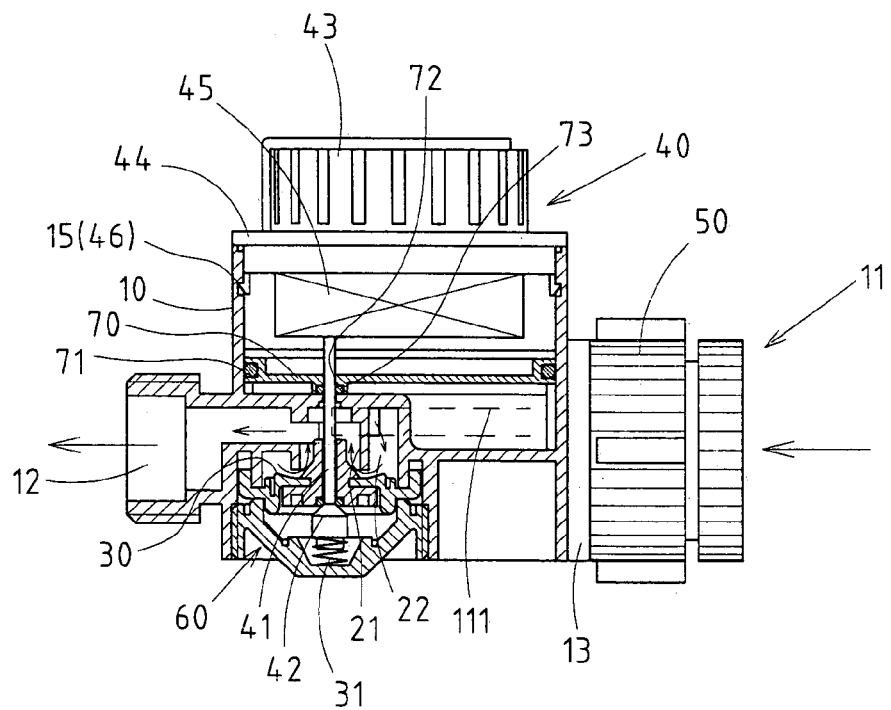
FIG. 11 shows a vertical sectional view of the water flow diagram in open state in the internal branch of the housing.

Based on above-specified innovative design for the channel, the water timer's channel in the present invention is activated or stopped as shown in FIGS. 8 and 9. When the timer set 40 is not activated, the membrane 30 is supported by the elastic member 31, and then adhered to the open bottom of central groove 21 and outer groove 22. Thereby, the water from first/second inlet 111 112 cannot flow towards the water outlet 12. Also, as shown in FIGS. 10 and 11, when the timer set 40 is activated, the brake bar 41 will be shifted downwards such that the bottom seat 42 will fall down. In such case, there is a loose state between the central surface of membrane 30 and central groove 21, so the water from first/second inlet 111 112 can flow into the central groove 21 from outer groove 22, and then towards the water outlet 12 (the arrows indicate the flow direction).

Figure 5:
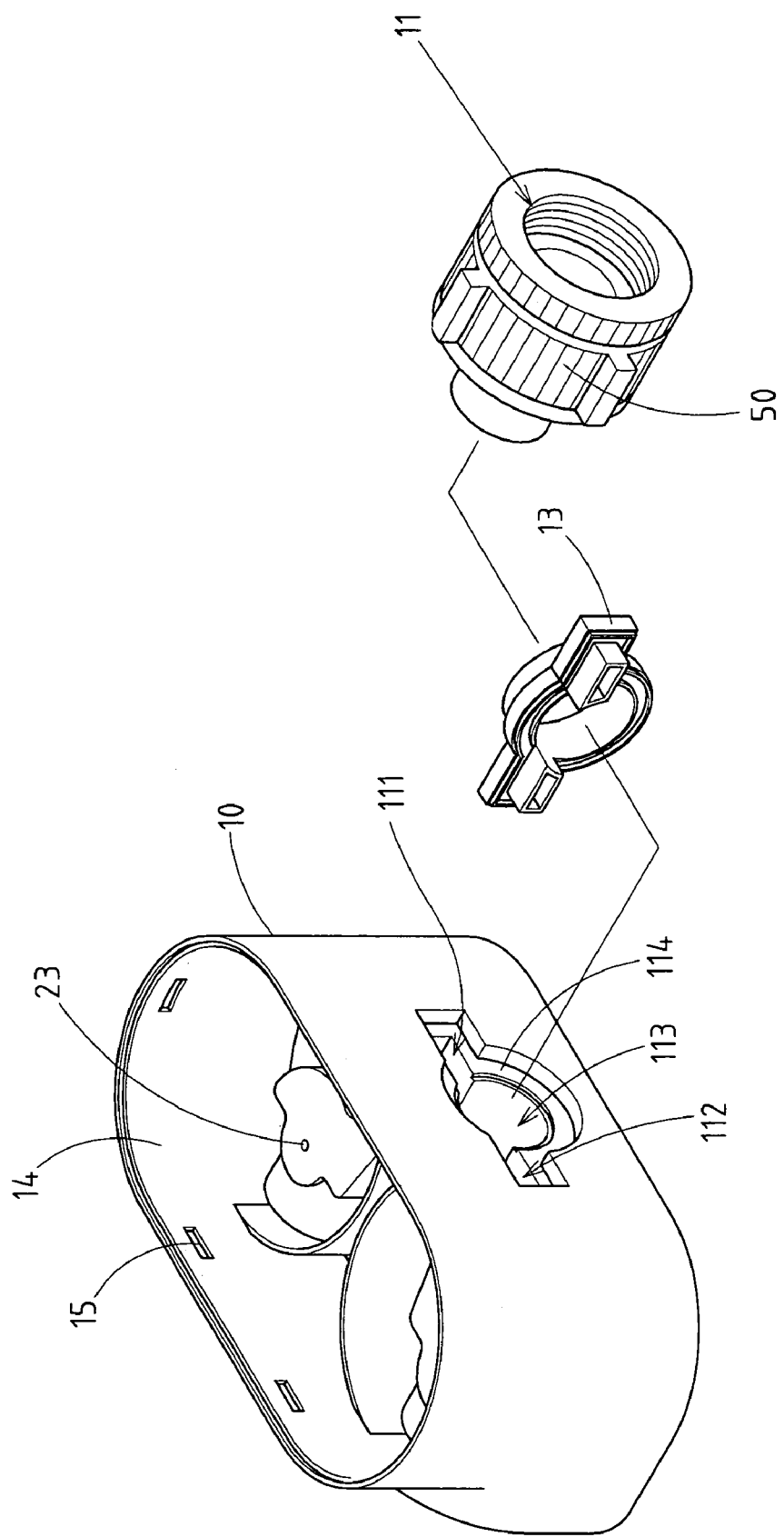
FIG. 5 shows an exploded perspective view of the outlet of the housing.
Figure 6:
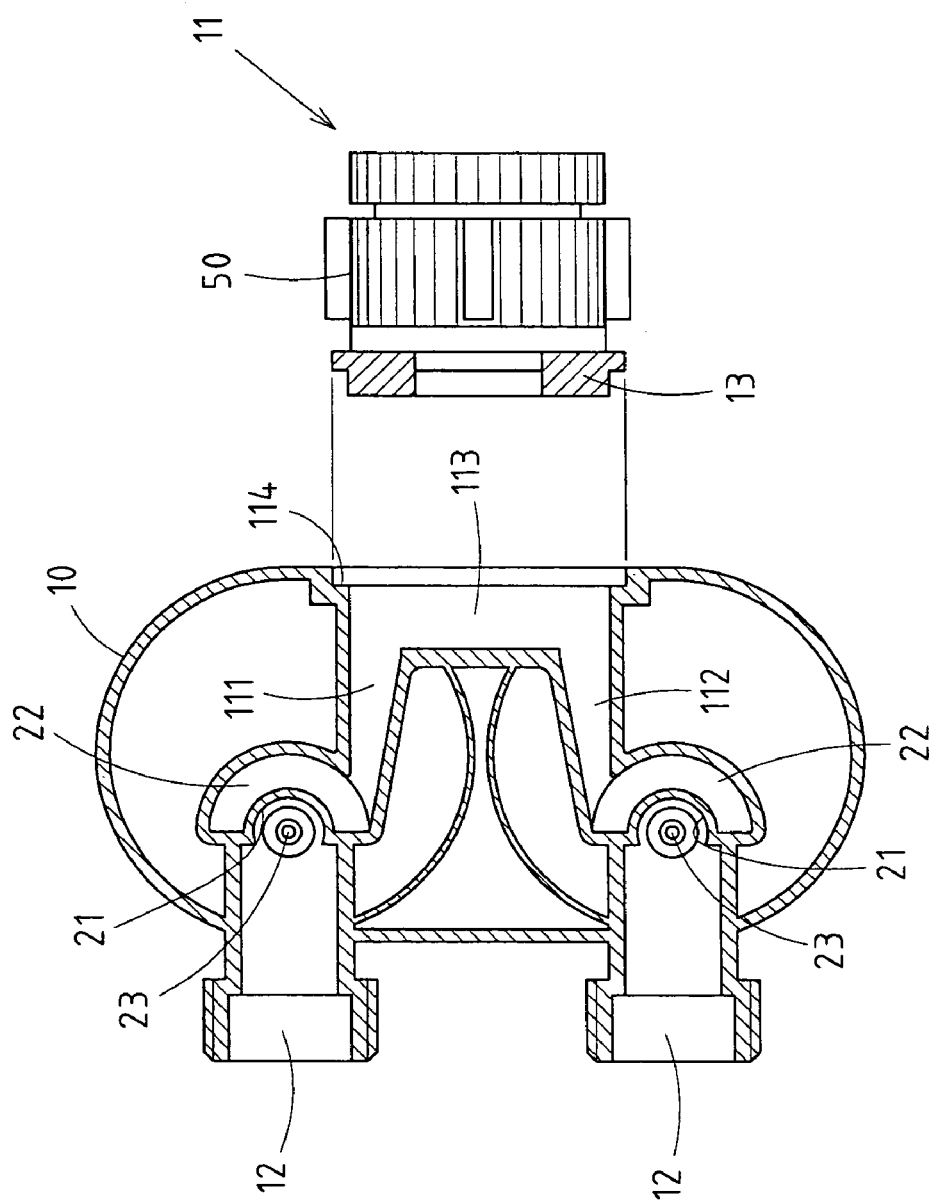
FIG. 6 shows a horizontal sectional view of the internal branch of the housing in decomposed state.

As shown in FIGS. 5 and 6, a joint edge 114 is provided at the open outer surface of manifold branch 113 for the imbedding of connecting seat 13 (imbedding state shown in FIG. 8).

Figure 4:
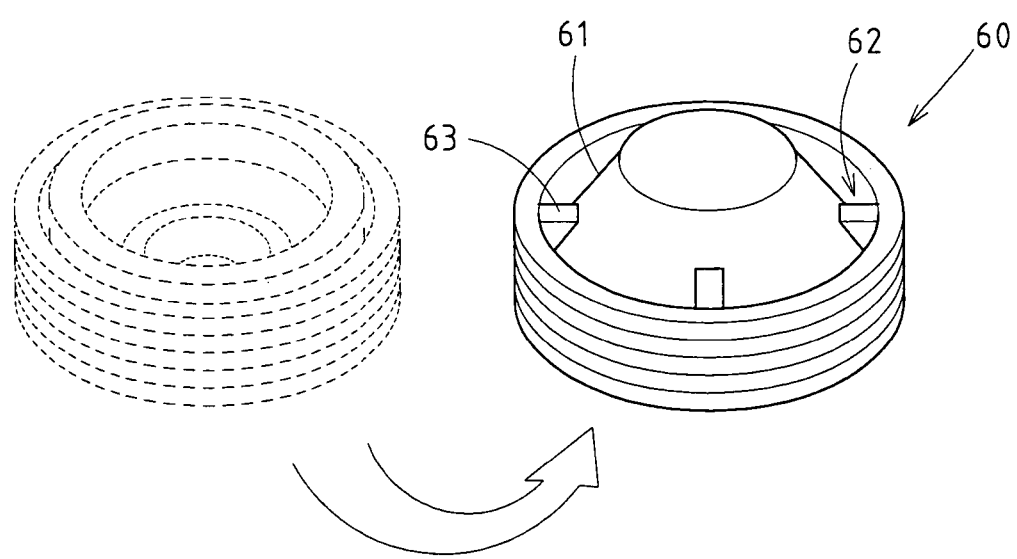
FIG. 4 shows a lateral view of the bottom cap in FIG. 2.

The bottom cap 60 of the water channel 20 can be screwed securely. As also shown in FIG. 4, the bottom cap 60 is designed with a cone cylinder 61 at its central surface, an inner groove 62 and spaced ribs 63 in a scattered way.

Figure 2:
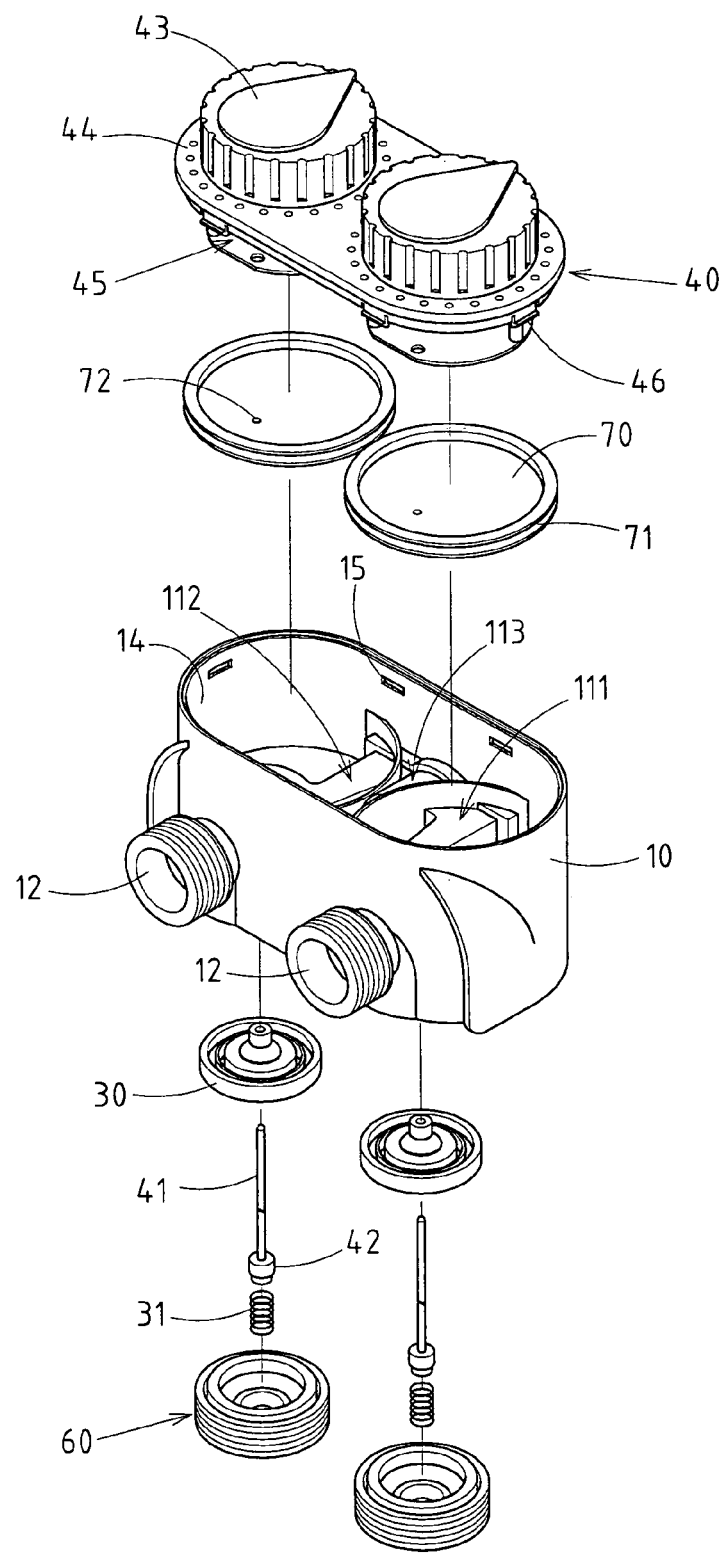
FIG. 2 shows an exploded perspective view of the present invention.
Figure 3:
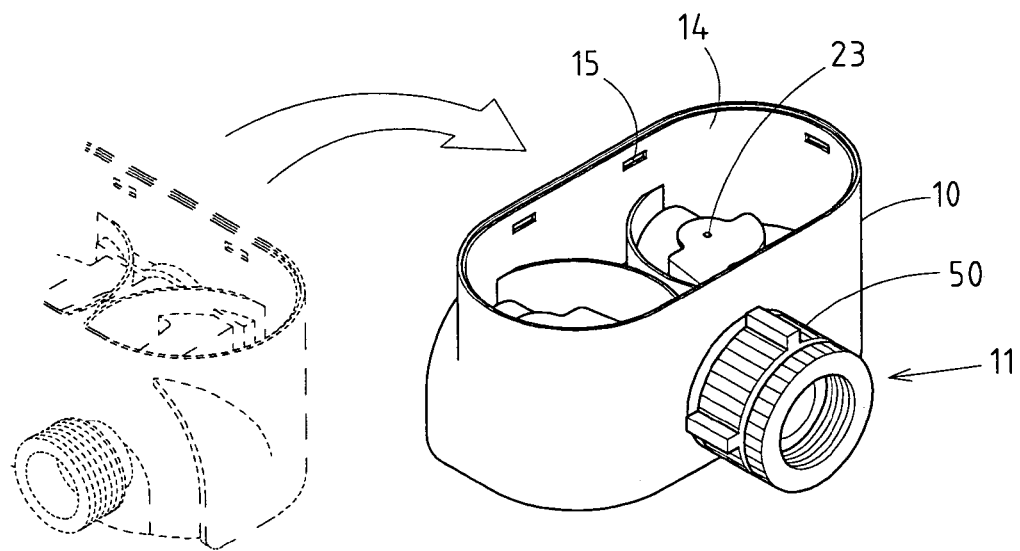
FIG. 3 shows a lateral view of the housing in FIG. 2.
Figure 7:
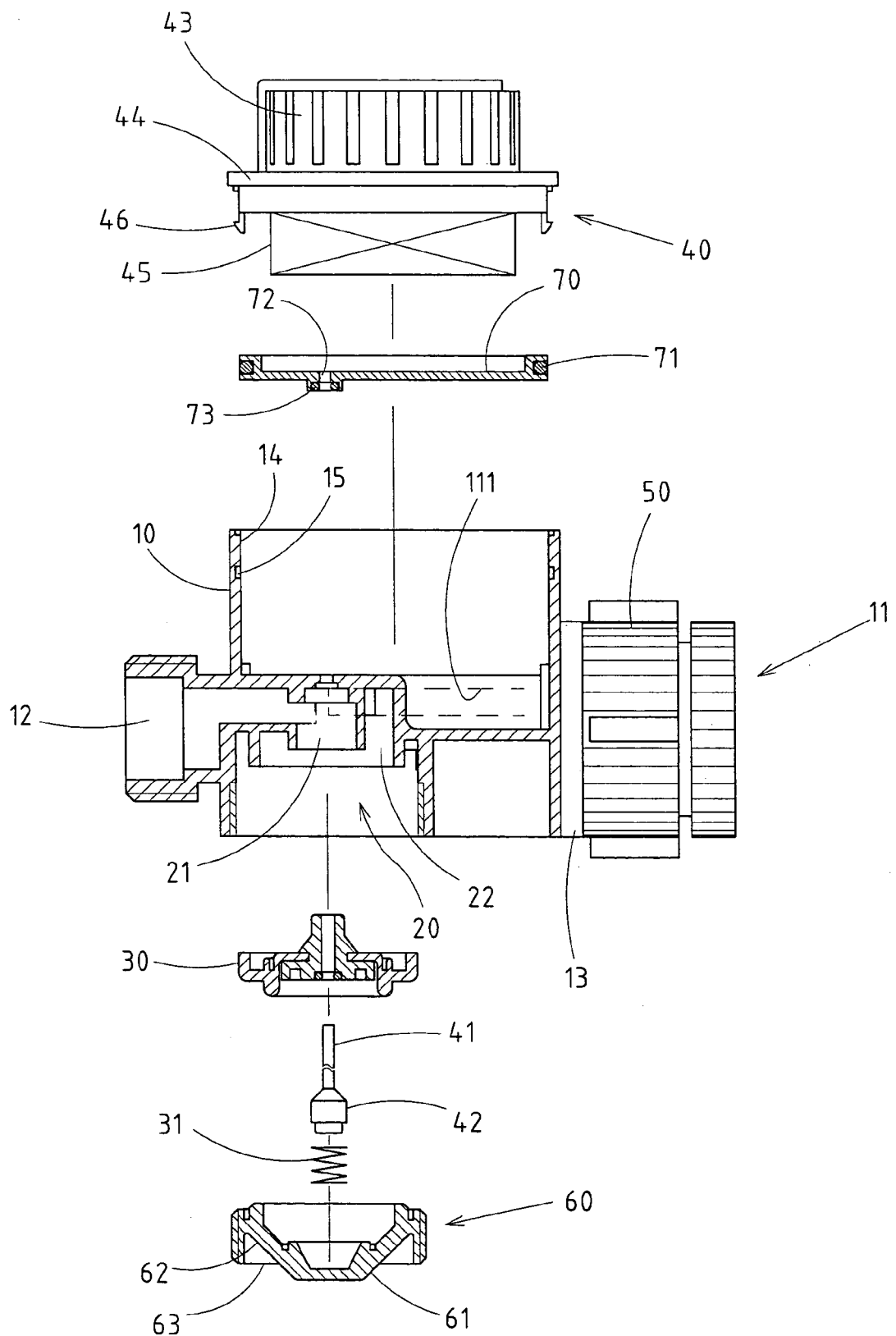
FIG. 7 shows a vertical sectional view of the internal branch of the housing in decomposed state.

As shown in FIGS. 2 and 8, the timer set 40 comprises a rotary knob 43, a seat board 44 and an actuator 45, among which the rotary knob 43 is mounted over the seat board 44, and the actuator 45 below the seat board 44. A couple of trips 46 are installed at lateral surfaces of the seat board such that a notch 14 is formed at the top of housing 10. Several locking grooves 15, which are provided adjacent to the notch, allow the locking of seat board's trip 46 and positioning of timer set 40 and housing 10 (as shown in FIG. 9). As shown in FIGS. 7 and 9, the top notch 14 of the housing 10 is provided with a watertight baffle plate at the lower part of the actuator 45 of timer set 40. Some stop rings 71 are mounted around the watertight baffle plate 70 to realize air-tightness with the inner wall of the notch 14 of housing 10. Besides, the watertight baffle plate 70 is provided with a punch hole 72, which allows the perforation of the brake bar 41 of timer set 40. And, the punch hole 72 is also equipped with a stop ring 73 for the air-tightness with brake bar 41, thereby avoiding any water leakage.

I claim:

1. A water timer comprising:
   a housing with a water inlet and at least two water outlets said water inlet being connected to water outlets via a water channel, said water channel being mounted with a membrane to control start/stop of water flow; and
   a time set installed onto a top of said housing, said time set having a brake bar to connect said membrane in a manner to control opening time of the membrane; wherein
   said water inlet, two water outlets and water channel are integrated into said housing, said water inlet having a concave "⊏"-shaped Y-branch at a first side of the housing and forming a first inlet, second inlet and a manifold branch linking the first and second inlet, said manifold branch having an open lateral surface and being enclosed by a connecting seat, said connecting seat with an exterior thereof linking a water supply connector to form the water inlet, said two water outlets being integrally preformed at a second side of the housing opposite to the water inlet, said water channel being installed between two water outlets and an inner side of first/second inlet and comprised of a central groove and outer groove with a downward aperture, an inner side of the first/second inlet being connected to the outer groove, the inner side of two water outlets being connected to the central groove, said central groove having a punch hole at an upper wall thereof such that said brake bar of said timer set penetrates downwardly when the membrane is provided at an open bottom of central groove and outer groove, said water channel having a bottom cap mounted at a bottom thereof, and an elastic member installed between the bottom cap and the membrane.

2. The water timer defined in claim 1, further comprising:
   a joint edge at an open outer surface of said manifold branch imbedable into said connecting seat.

3. The water timer defined in claim 1, wherein said bottom cap of said water channel is securely screwingly engaged.

4. The water timer defined in claim 3, wherein said bottom cap comprises a cone cylinder at a central surface thereof, an inner groove and spaced ribs in a scattered way.

5. The water timer defined in claim 1, further comprising:
   a rotary knob, a seat board and an actuator, said rotary knob being mounted over the seat board, and the actuator below the seat board, a plurality of trips being installed at lateral surfaces of the seat board such that a notch is formed at the top of housing, a plurality of locking grooves being provided adjacent to the notch, locking of a trip of said seat board and positioning of said housing.

6. The water timer defined in claim 5, wherein a top notch of said housing is comprised of a watertight baffle plate at a lower part of an actuator, a plurality of stop rings being mounted around a watertight baffle plate in air-tight relation to an inner wall of the notch, the watertight baffle plate having a punch hole perforating the brake bar, said punch hole being comprised of a stop ring for air-tight relation to the brake bar.

* * * * *